United States Patent [19]

Williams et al.

[11] 4,428,280

[45] Jan. 31, 1984

[54] COOKING APPARATUS

[75] Inventors: Ronald H. Williams, 52A Greenland Rd.; Mason T. Elliott, 3/77 Sylvia Rd., both of Auckland, New Zealand; Leonard S. Moss, Brisbane, Australia

[73] Assignees: Ronald Harry Williams; Mason Thomas Elliott, both of Auckland, New Zealand; Alexander Peter Mirmikidis, Perth, Australia

[21] Appl. No.: 323,562

[22] Filed: Nov. 20, 1981

[30] Foreign Application Priority Data

Nov. 21, 1980 [NZ] New Zealand .................. 195614
Dec. 22, 1980 [NZ] New Zealand .................. 195909

[51] Int. Cl.³ ................................ A47J 37/12
[52] U.S. Cl. ........................ 99/356; 99/407; 99/443 C; 193/2 B; 221/150 A
[58] Field of Search ............ 99/356, 407, 357, 443 R, 99/443 C; 221/150 A; 193/2 B

[56] References Cited

U.S. PATENT DOCUMENTS

| 1,269,544 | 6/1918 | Marshall | 193/2 B |
| 2,765,900 | 10/1956 | Seabrooke | 193/2 B |
| 3,357,341 | 12/1967 | Kocken | 99/407 X |
| 3,448,677 | 6/1969 | Dexters | 99/407 X |
| 3,667,373 | 6/1972 | Sicher | 99/407 |
| 3,690,247 | 9/1972 | Van Cleven | 99/407 X |
| 3,896,715 | 7/1975 | Mascret | 99/356 |
| 4,359,935 | 11/1982 | Murray | 99/407 X |

FOREIGN PATENT DOCUMENTS

| 1308782 | 3/1973 | United Kingdom | 99/407 |
| 1337547 | 11/1973 | United Kingdom | 99/407 |
| 2063654 | 6/1981 | United Kingdom | 99/407 |

*Primary Examiner*—Billy J. Wilhite
*Attorney, Agent, or Firm*—Holman & Stern

[57] ABSTRACT

A cooking apparatus is provided comprising a hopper for storing raw or precooked foodstuffs; metering means constructed and arranged to meter by weight a predetermined quantity of foodstuffs received from the hopper, a vibratory conveyor operable to promote the movement of foodstuffs from the hopper to the metering means by gravity; a cooking medium; and a cooking container displaceable between a first position in which the container receives foodstuffs from the metering means, a second position in which the foodstuffs in the cooking container are placed in the cooking medium and a third position in which the foodstuffs may be dispensed.

12 Claims, 11 Drawing Figures

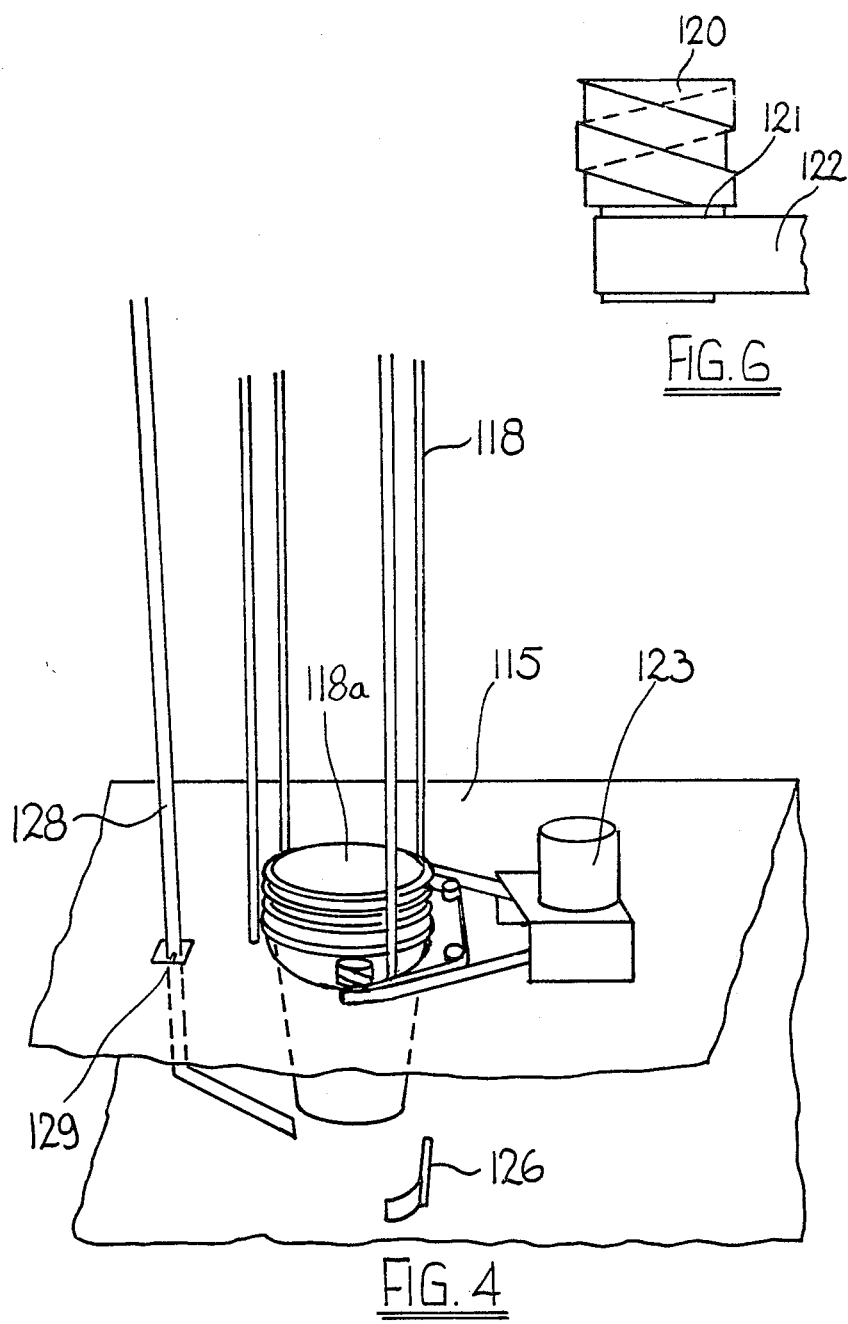

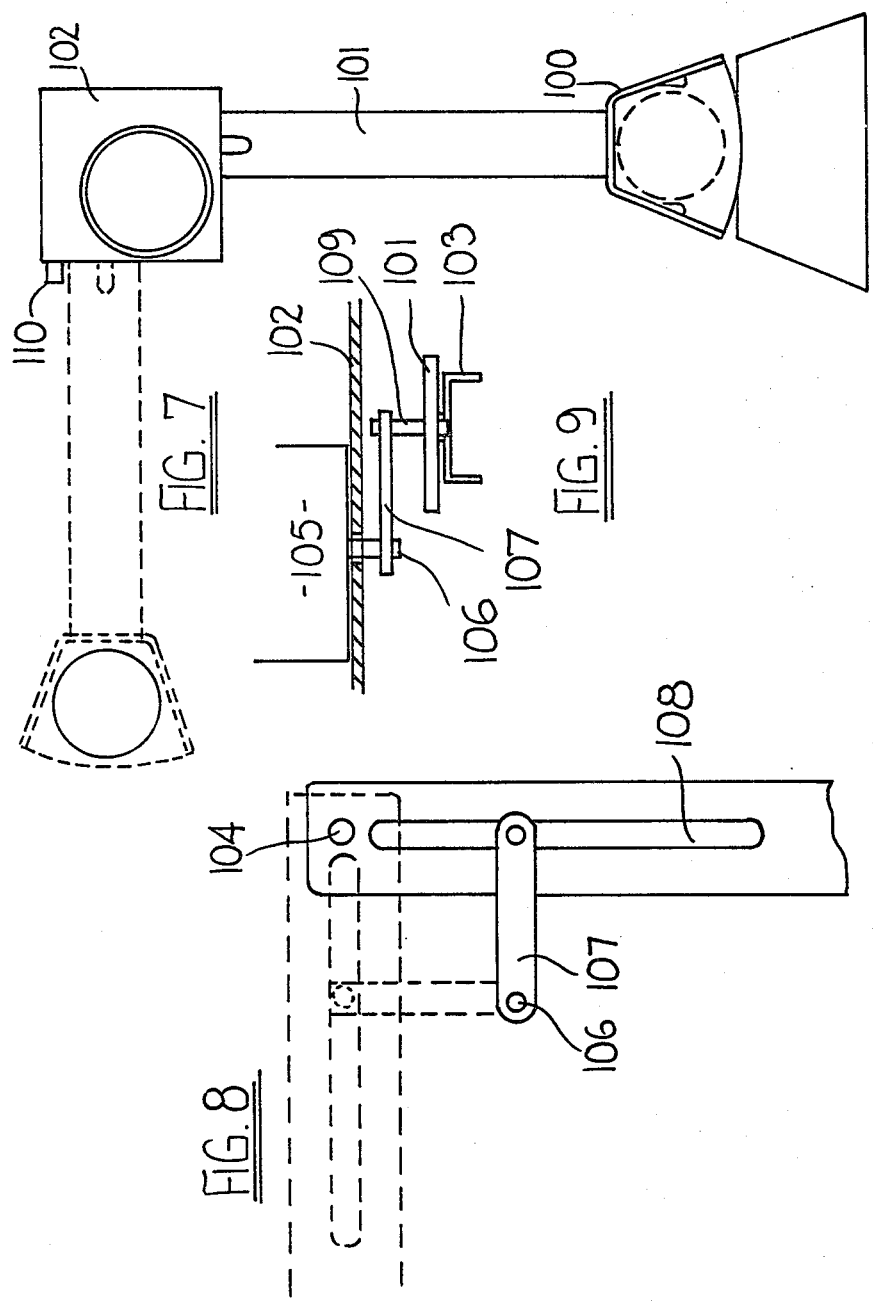

COOKING APPARATUS

BACKGROUND OF THE INVENTION

This invention relates to cooking apparatus and in particular, though not necessarily solely, to apparatus for cooking and dispensing foodstuffs such as french fried potatoes (more commonly known in English-speaking countries other than the United States as "potatoe chips").

SUMMARY OF THE INVENTION

Accordingly, the invention comprises apparatus for cooking foodstuffs including a hopper for storing raw or pre-cooked foodstuffs; metering means constructed and arranged to meter a predetermined quantity of foodstuffs received from said hopper; vibratory gravity conveying means operable to convey foodstuffs from said hopper to said metering means; a cooking medium; and a cooking container cyclically displaceable between a first position in which said container receives foodstuffs from said metering means, a second position in which the foodstuffs in said cooking container are placed in said cooking medium; and a third position in which the foodstuffs may be dispensed from said cooking container.

To those skilled in the art to which this invention relates, many changes in construction and widely differing embodiments and applications of the invention will suggest themselves without departing from the scope of the invention as defined in the appended claims. The disclosures and the descriptions herein are purely illustrative and it is not our intention to limit the scope of the invention by those disclosures and descriptions, or otherwise, than by the terms of the appended claims.

BRIEF DESCRIPTION OF THE DRAWINGS

One preferred form of the invention will now be described with reference to the accompanying drawings in which:

FIG. 4 shows a perspective view of cup dispensing means suitable for use in cooking apparatus according to the invention;

FIG. 6 shows a side elevational view of a spiral wheel incorporated in the cup dispensing apparatus depicted in FIGS. 4 and 5;

FIG. 7 shows a plan view of a cup locating and delivery apparatus suitable for use in cooking apparatus according to the invention;

FIG. 8 shows an enlarged view of part of the apparatus depicted in FIG. 7;

FIG. 9 shows an elevational view of the drive arrangement for the cup locating arm depicted in FIGS. 7 and 8;

DETAILED DESCRIPTION OF THE INVENTION

Figure 1:
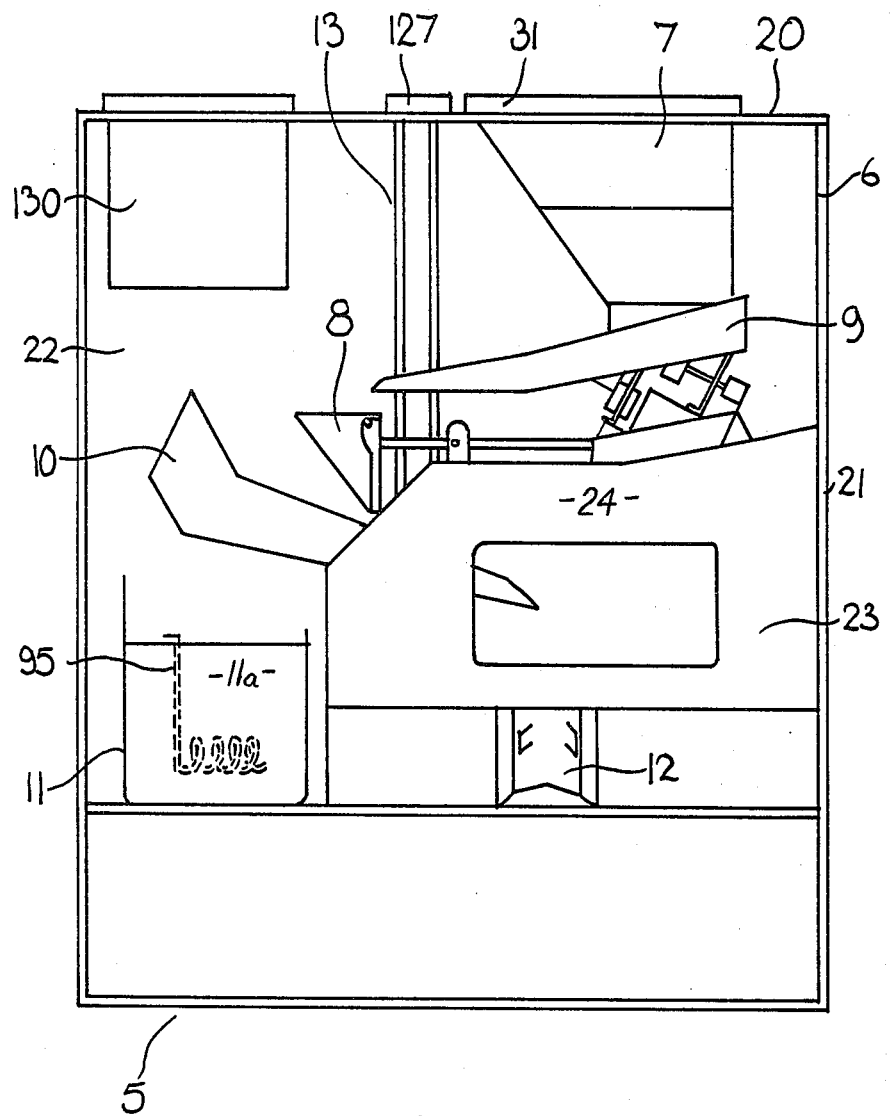
FIG. 1 shows a schematic front elevational view of apparatus according to the invention with the front cover of the apparatus removed.

Referring to the drawings, and in particular FIG. 1, according to the invention there is provided cooking apparatus generally indicated by reference numeral 5 comprising a cabinet 6 in which is housed a hopper 7 for storing raw or pre-cooked vegetable chips, metering means 8 for metering a predetermined quantity of chips received from the hopper 7, vibratory conveying means 9 for delivering chips from the hopper 7 to the metering means 8, and a cooking container 10 which is displaceable between a first position in which it receives a metered quantity of chips from the metering means 8, a second position in which it is immersed in a cooking medium such as vat 11 containing hot oil 11a, and a third position in which it dispenses the cooked chips to a dispensing station 12. The apparatus preferably further includes cup dispensing means, part of which is indicated by reference numeral 13 and means, which will be described hereinafter, for moving the cup from the dispensing apparatus to the dispensing station 12.

Figure 3:
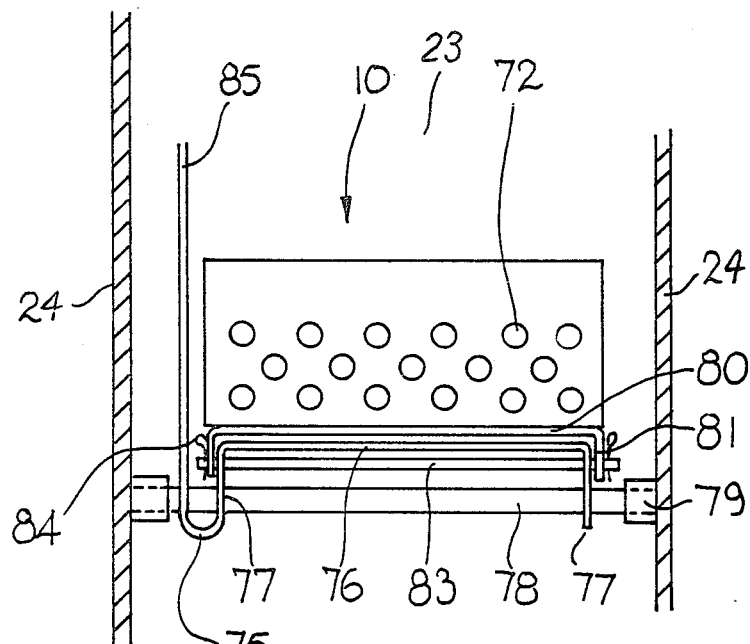
FIG. 3 shows a partial end elevational view of a cooking basket and its associated mountings used in cooking apparatus according to the invention.

As shown, the cabinet 6 is a rectangular structure having upper surface 20, side walls 21 and rear wall 22. Mounted within the cabinet is a chasis 23 comprising front and rear plates 24, (FIG. 3) which serve to mount the vibratory conveying means 9, the metering means 8 and the cooking container 10.

As can be seen from FIG. 1, the hopper 7 is mounted in an upper corner of the cabinet 6 and passes through the top surface 20 of the cabinet. A cover 31 covers the upper end of the hopper 7 and this cover may be displaced to an open position to allow raw or pre-cooked vegetable chips to be loaded into the hopper.

Figure 10:
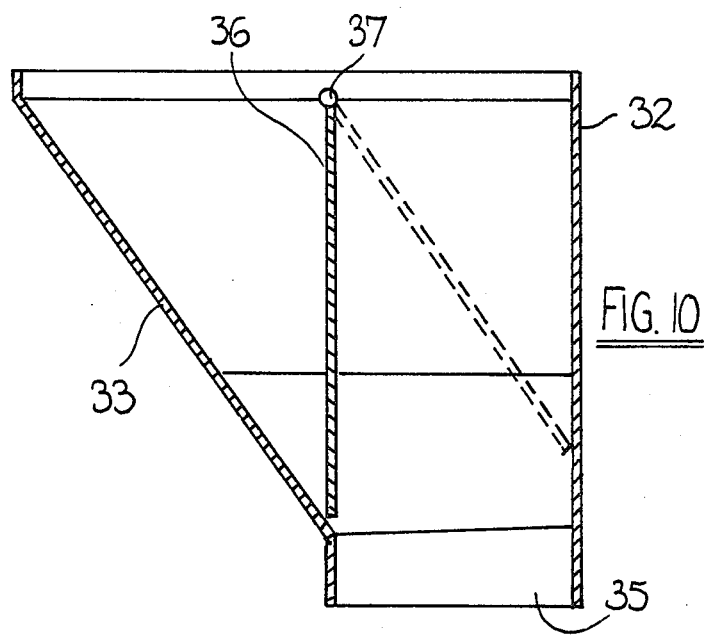
FIG. 10 shows a cross-sectional elevational view of a hopper used in the cooking apparatus according to the invention.
Figure 11:
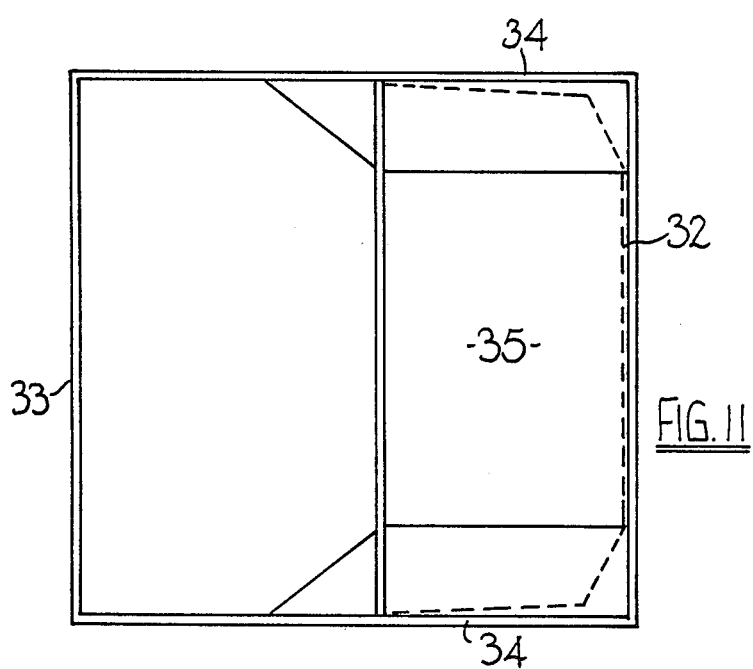
FIG. 11 shows a top plan view of the apparatus depicted in FIG. 10.

Referring to FIGS. 10 and 11, the hopper has a substantially vertical rear wall 32, a downwardly and inwardly sloping front wall 33 and a pair of side walls 34, the lower ends of which taper inwardly to, in combination with rear wall 32 and front wall 33, define a substantially rectangular delivery aperture 35 which, as can be seen from FIG. 1, is mounted above the vibratory conveying means so as to deliver chips thereto under gravity.

To prevent clogging of the chips in or about the delivery aperture 35, a baffle plate 36 is provided which is mounted on a pivot rod 37 fixed between the side walls 34. When the hopper is completely empty the baffle 36 assumes the position shown in solid outline in FIGS. 10 and 11 under gravity. As the hopper is filled chips are stored on either side of the baffle 36 and the position of the baffle plate does not move substantially. As the hopper empties however chips to the right hand side of the baffle plate, as shown, pass through the delivery aperture 35, the effect of the baffle plate being to provide a smaller substantially rectangular chamber within the hopper 7. Once all the chips to the right hand side of the baffle plate have passed through the delivery aperture 35, the weight of the chips to the left hand side of the baffle plate displaces the same to the position shown in dotted outline in the figures thus providing a further substantially parallel walled chamber from which chips are dispensed through the outlet (delivery) aperture 35.

We have found that the provision of the baffle plate 36 which in operation divides the hopper into two substantially parallel chambers avoids clogging of the chips in or about the delivery aperture 35.

Figure 2:
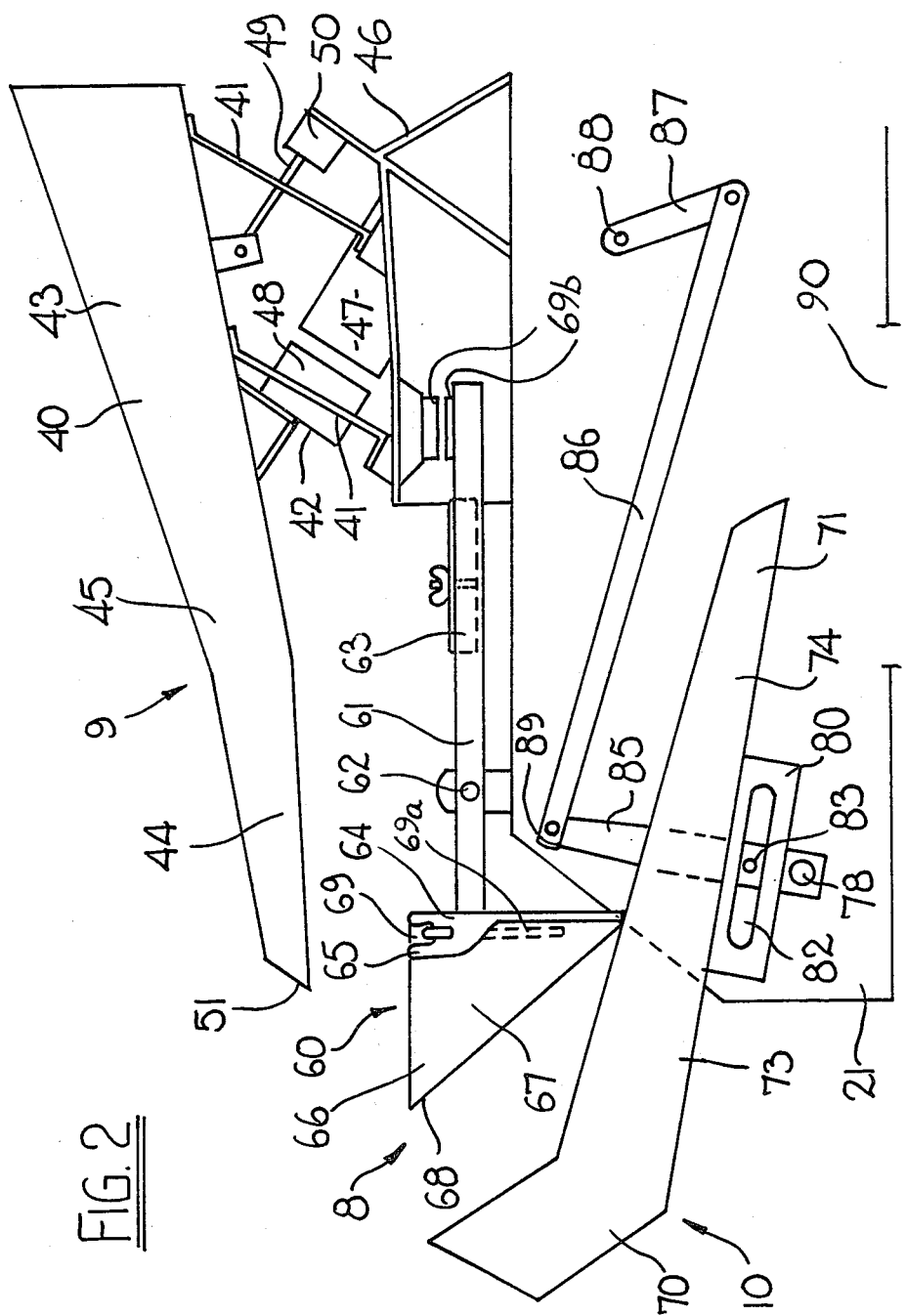
FIG. 2 shows an enlarged partially cut-away view of part of the apparatus shown in FIG. 1.

Referring now to FIG. 2, the vibratory conveying means generally designated 9, comprises a vibrating ramp member 40 mounted on the chassis 23 preferably on leaf springs 41. Displacement means 42 are provided to displace the ramp 40 with respect to the chassis 23.

The ramp member 40 is in the form of a chute having a rear section 43, the base of which is mounted at an angle of about 15° to the horizontal; and a front section 44, the base of which is mounted substantially horizontally. Ramp side walls 45 extend along either edge of the base parts of sections 43 and 44.

As can be seen four metallic leaf springs 41 are mounted on the underside of the base of section 43 of the ramp 40, the lower ends of the leaf springs 41 being mounted on a sub-frame 46 affixed to the upper edges of the front and rear plates 24 of the chassis 23.

The means 42 to displace the ramp 40 preferably comprises an electro magnet 47 and co-acting ferro-magnetic plates 48, the magnet 47 being mounted on the sub-frame 46 and the ferro-magnetic plates 48 being mounted on the underside of the ramp 40. The magnet 47 is energised using a pulsating D.C. power source which, of course, has the effect of imparting a vibratory motion to the ramp 40.

The frequency of the pulsating signal fed to the magnet 47 is preferably adjusted to equate substantially to the mechanical resonant frequency of the springs 41 and the ramp 40 to maximise the vibratory action for a given electrical signal.

The vibratory conveying means 9 preferably further includes means to modulate the amplitude of vibration of the ramp 40 and to this end a small magnet (not shown) is mounted on the end of rod 49 which projects from the underside of the ramp 40, the magnet moving axially within coil 50, mounted on sub-frame 46, as the ramp 40 vibrates with respect to the chassis 23. The axial displacement of the magnet within the coil 50 generates an electric signal which is processed so as to modify the mark—space ratio and thereby increase or decrease the power supplied to magnet 47. This in turn ensures that regardless of the load placed on the ramp 40, the amplitude of vibration is always the same.

The chips conveyed by the vibratory conveying means 9 are delivered into the metering means 8 which is positioned beneath the forward end 51 of the ramp 40. As shown the metering means 8 is constructed and arranged to meter a predetermined weight of chips and to this end comprises a chip receiver 60 mounted on arm 61 which is pivotally mounted to the chassis 23 at 62. A weight 63 counterbalances the receiver 60, the position of the weight 63 being adjustable to allow varying weights of chips to be metered.

The chip receiver 60 comprises a rear wall 64 which is mounted on the arm 61, a pair of mounting brackets 65 being provided on opposed side edges of the rear wall 64 to provide mounting means for the receiver body 66 which comprises a pair of side walls 67 and a front wall 68. A mounting rod 69 passes between the side walls 67 and engages in slots provided in the brackets 65. It will be appreciated from the figures that the receiver body 66 is mounted adjacent its upper edge and accordingly the receiver falls to a closed position under its own weight. A vertically downward extension 69a of the mounting rod 69 is provided to allow the receiver to be opened in a manner which will be described hereinafter.

Means are preferably provided to switch off the vibratory conveying means 9 once a predetermined weight of chips has been delivered into the metering means 8 and to this end a pair of switch contacts 69b are provided, one contact being on the end of the arm 61 and the other being mounted on subframe 46 in a position contactable by the other contact. When the predetermined quantity of chips have been received by the receiver 60 the arm 61 is pivotted about pivot 62 so that the switch contacts 69b engage and cut off the power supply to the magnet 47.

From the metering means 8, the metered quantity of chips is delivered into a cooking container 10. As can be better seen from FIG. 3 the cooking container 10 is preferably pivotally suspended between front and rear plates 24 of the chassis 23.

Turning again to FIG. 2 the cooking container 10 includes a cooking part 70 integrally formed with a delivery part 71. The cooking part 70 is preferably basket shaped and includes apertures 72 (FIG. 3) in the walls thereof to allow the cooking medium to pass into the basket shaped cooking part 70 and thereby cook the chips therein. A planar base surface 73 extends from the cooking part 70 to the delivery part 71 which merely comprises a delivery chute. Side walls 74 in combination with the base 73 define the delivery chute.

The cooking container is slidably mounted for reasons which will be hereinafter described. To this end a first bracket 75 is provided which is formed to the cross sectional shape shown in FIG. 3 and includes a transverse plate member 76 having downwardly extending legs 77 at either side thereof, the legs 77 mounting pivot rod 78 which is fixed thereto. Pivot rod 78 in turn locates in sockets 79 fixed to the inner faces of front and rear plates 24 to support the assembly within the chassis 23. Fixed to the underside of the cooking container is a U-shaped bracket 80 the two flanges 81 of the U including longitudinal slots 82. A further (retaining) pin 83, located in the legs 77 of the first bracket 75, extends through slots 82 thus allowing the cooking container 70 with affixed bracket 80 to slide with respect to the bracket 75. Locking pins 84 retain the pin 83 with respect to the bracket 80.

Extending upwardly from the inner end of pivot rod 78 is an actuating arm 85. As can be seen from FIG. 2 this actuating arm 85 is pivotally connected to link arm 86 which in turn is pivotally mounted to one end of crank arm 87. The crank arm 87 is rotatably driven by a primary drive motor (not shown).

The cooking container is shown in the rest position in FIG. 2. As the crank arm 87 is rotated in a clockwise position the cooking container and slide assembly is rotated in an anti-clockwise position about pivot rod 78. When the crank arm 87 is in the horizontal position to the left of pivot 88 the cooking part 70 is substantially lower than the delivery part 71. This defines the cooking position and in this position the right hand end of slot 82 is in contact with the retaining pin 83. Thus the movement of retaining pin 83 in slots 82 defines a notional line.

As the cooking container moves from the rest position to the cooking position a projection cam 89 on the forward end of link arm 86 engages extension 69a of the mounting rod 69 on the metering means 8 thus opening the chip receiver 60 and allowing the contents thereof to pass under gravity into the cooking part 70 of the cooking container, the geometry of the apparatus being such that when the chip receiver 60 is opened the cooking section 70 of the means 10 is vertically lower than the delivery section 71.

Once the cooking cycle has been completed the crank arm 87 rotates further drawing the cooking container 10 back through the rest position shown until the crank arm 87 is in a substantially horizontal position to the right of pivot 88. In this position the delivery section 71 is somewhat lower than the position depicted in FIG. 2 and considerably lower than the cooking section 70 thus allowing the cooked chips to pass under gravity through aperture 90 and to the dispensing station 12. Further, as the cooking container 10 moves to the dispensing position the U bracket 80 slides with respect to the first bracket 75 until the pin 83 engages the left hand ends of slots 82. The jerk thus imparted to the container 10 ensures that any chips caught up in the interior of the cooking container 10 are dislodged.

When in the cooking position the cooking part 70 of the cooking container 10 is immersed in hot oil contained within the vat 11, the oil being heated by means of heating coil 95.

During the cooking operation a paper or plastic cup is placed into the dispensing station 12 and this is preferably-effected by means of the apparatus depicted in FIGS. 7 to 9.

Referring to FIGS. 7 to 9 a cup holder 100 is provided mounted on the end of arm 101 which is pivotally mounted beneath motor mount 102 on arm mount bracket 103, the pivot axis being indicated by reference numeral 104 in FIG. 8. A motor 105 is mounted on mount 102 as can be seen from FIG. 9, the drive shaft 106 of the motor projecting down beneath the upper surface of mount 102 and in turn mounting crank arm 107. It will further be seen that the axis of shaft 106 is offset from the pivot axis 104 of arm 101.

Provided longitudinally of arm 101 and adjacent the rear edge thereof is a slot 108, the axis of the slot lying on a line with pivot axis 104 of the arm 101. Projecting downwardly from crank arm 107 so as to engage in slot 108 is a drive peg 109.

It will be appreciated that as the crank arm 107 is rotated in a clockwise direction by motor 105 the arm 101 is rotated in a clockwise position. Further, since the sum of the distance between pivot axis 104 and drive shaft 106 and the length of crank arm 107 is less than the distance between pivot axis 104 and the remote end of slot 108 the crank arm 107 passes through the over centre position when pivoting the arm 101 between the position shown in solid outline in FIGS. 7 and 8 and a position perpendicular thereto shown in dotted outline. It will further be appreciated that when the arm 101 and crank 107 are in the position shown in dotted outline in FIGS. 7 and 8, further rotation of the crank 107 will rotate the arm 101 in an anti-clockwise direction back toward the position shown in solid outline.

The motor mount 102 and arm mount bracket 103 are positioned within the cabinet so that when the arm 101 is in the position shown in solid outline the cup holder 100 is in the dispensing station 12 beneath the delivery end of the cooking container 10 and when the arm 101 is in the position as shown in dotted outline the cup holder 100 is vertically beneath cup dispensing means which will now be described.

Figure 5:
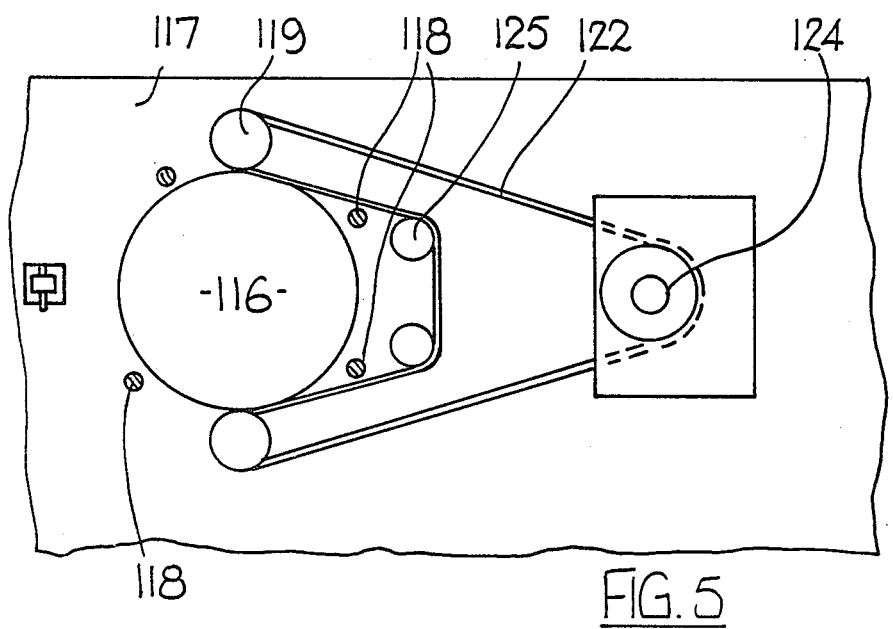
FIG. 5 shows an upper plan view of the apparatus depicted in FIG. 4.

Referring now to FIGS. 4 to 6, cup dispensing apparatus generally designated 115 is preferably provided to place a cup into the cup holder 100 when the arm 101 and cup holder 100 are in the positions shown in dotted outline in FIGS. 7 and 8.

To this end a delivery aperture 116 is provided in a ledge 117 extending from the rear wall of the cabinet 6 through which paper or plastic cups of the required size may be dispensed. A plurality of rods 118 are positioned about the aperture 116 to retain a stack 118a of cups in the proper relationship to the aperture 116.

Mounted on opposed points about the aperture 116 are a pair of spiralled wheels 119, one of which is shown in greater detail in FIG. 6. As can be seen the wheels 119 include a downwardly spiralling cup engaging surface 120 and a drive section 121 of lesser diameter about which a drive belt 122 is passed so as to impart rotation to the wheels 119.

As can be seen more particularly from FIG. 5 the drive belt 122 is an endless member of the cogged type driven from motor 123. A pulley 124 is mounted on the drive shaft of the motor 123 and the belt passes about both spiralled separating wheels 119 as well as about the drive pulley 124. A pair of idler wheels 125 are situated between the separating wheels 119 to direct the belt away from the aperture 116.

As can be seen from FIG. 4 the rim of the lowermost cup in the stack rests on the upper edge of the separating wheels 119 and accordingly as the wheels are rotated the rim is captured in the downward spiral and is thus separated from the remaining cups in the stack and falls through aperture 116. As the cup passes through aperture 116 a flap switch 126 is displaced which cuts current to the drive motor 123 until the next delivery cycle.

Returning now to FIG. 1 the upper end of rods 118 are engaged with the upper surface 20 of the cabinet and a removable cup insert cover 127 is provided to allow cups to be inserted into the dispensing apparatus 115. To prevent cups from falling straight through the dispensing apparatus during the filling operation a displaceable stop bar 128 is provided which is pivotally mounted at 129 to the ledge 117 and, when cup cover 127 is removed, rotates in a counterclockwise direction to project over the space beneath the aperture 116. When the cover 127 is again replaced the stop bar 128 is rotated in a clockwise direction so as to not project over the area of the delivery aperture.

Finally, the apparatus preferably further includes a suitable fan and filter enclosed in exhaust housing 130 to draw fumes from the cooking operation out of the cabinet enclosure and as can be seen the housing 130 is fixed to the 20 of the cabinet 6.

The apparatus as hereinabove described is provided with suitable control means which does not form part of the invention. The form of the control means would however be readily obvious to a person skilled in the art and will be apparent from the following description of the operation of the apparatus.

The initial position of the apparatus is substantially as shown in FIGS. 1 and 2 with the cooking container 10 shown in the rest position.

The commencement of the operating cycle is initiated by the insertion of coins into the coin feed mechanism (not shown) which activates the machine and in particular activates the power supply to the magnet 47 and thereby imparts a vibratory motion to the conveyor 9.

The vibratory conveying means 9 receives chips from the hopper 7 under gravity and conveys the chips to the forward end thereof from where the chips fall under gravity into the receiver 60 of the metering means 8. When a predetermined weight of chips have been received in the receiver 60, the arm 61 pivots in a counterclockwise direction about pivot mount 62 closing the switch contacts 69b thus cutting current to the magnets 47.

When the receiver 60 is full of chips and the current to magnet 47 stopped the motor driving crank arm 87 is activated rotating the crank arm 87 in a clockwise direction. As the link arm 86 is displaced forward the surface of projection cam 89 thereon engages the downward extending rod 69a while simultaneously rotating the cooking container 10 in a counterclockwise direction. The action of the projection cam 89 on the extending rod 69a opens the receiver 60 which releases the quantity of chips into the cooking section 70 of the basket. Further rotation of the crank arm 87 displaces the cooking container still further until the crank arm 87 reaches a substantially horizontal position to the left of the pivot 88 whereupon a further switch is contacted cutting power to the drive motor and activating a timer. In this position the cooking container 10 with attached U bracket 80 slides to the lowermost position defined by the contact of retaining pin 83 on the right hand end of slots 82 and in this position the cooking section 70 of the container 10 is fully immersed in oil 11a in vat 11.

At the end of the cooking cycle, determined by the timer, the motor driving crank arm 87 is again activated, driving crank arm 87 further clockwise and thus drawing link bar 86 rearward and in so doing rotating the cooking container 10 in a clockwise direction until the crank arm 87 is again horizontal but to the right of pivot 88 and in this position a further switch is activated to stop the motor and activate a second timing cycle. In this position also the delivery part 71 of the cooking container is at its lowermost position and the chips may be dispensed under gravity to the dispensing station. Dispensing of the chips is aided by the cooking container 10 sliding over the first bracket 75 until the retaining pin 83 contacts the left hand ends of slots 82.

During the cooking operation the motor 105 is activated to rotate arm 101 from the straight ahead position shown in solid outline in FIGS. 7 and 8 to the cup receiving position shown in dotted outlines. When the arm 101 reaches the position shown in dotted outlines a further switch 110 is activated to cut the current to motor 105 and energise motor 123 which imparts drive to the spiralled separating wheels 119 to thereby dispense a cup into the cup holder 100 now positioned beneath delivery aperture 116. After flap switch 126 has been activated indicating that a cup has been released into cup holder 100 motor 105 is again activated to return the arm 101 to the straight ahead position beneath the dispensing station.

After the chips have been dispensed from the cooking container 10 into the cup retained in cup holder 100 the operator may remove the filled cup through a dispensing slide (not shown) provided in the front cover of the cabinet (not shown).

From the aforegoing it will be appreciate that the present invention provides means which meters a predetermined quantity of raw or precooked vegetable chips, displaces the metered quantity into a cooking medium, cooks the chips and then dispenses the metered and cooked chips into a dispensing receptacle. Since the apparatus incorporates a vibratory mechanism to convey chips from the hopper to the metering station the chips are not subject to any shearing or cutting action and thus a highly acceptable commercial product is provided to the end user.

What is claimed is:

1. Apparatus for cooking foodstuffs comprising:
 a gravity hopper for storing and discharging raw or precooked foodstuffs;
 metering means positioned lower than said hopper for metering a predetermined quantity of the foodstuffs received from the hopper;
 conveyor means operatively connected between said hopper and said metering means comprising a generally downwardly sloping walled ramp, for conveying said foodstuffs under force of gravity from said hopper to said metering means;
 vibrator means operatively associated with said conveyor means, for assisting the downward movement of the foodstuffs;
 a vat for holding a cooking medium, positioned lower than said metering means; and
 a cooking container displaceably positioned between said metering means and said vat, which is continuously cyclically displaceable between a first position in which said container receives foodstuffs from said metering means, a second position in which the foodstuffs move under force of gravity to a cooking part of said container and said cooking part is placed within said vat, and a third position in which the cooking part is removed from the vat and the foodstuffs move under force of gravity to a delivery part of said cooking container and are discharged.

2. The apparatus of claim 1 wherein said metering means is weight responsive and includes a counterbalanced pivotable arm having a foodstuff receiver on one side of its pivot axis and an adjustable weight on the other side.

3. The apparatus of claim 2 wherein said foodstuff receiver includes an openable wall section and means for biasing said wall section to a normally closed position.

4. The apparatus of claim 3 further including a power-operated linkage means for simultaneously opening the openable wall section of the foodstuff receiver of said metering means and displacing said cooking container from its third or discharging position to its first or receiving position.

5. The apparatus of claim 1 wherein a horizontal ramp section is provided on the lower end of the conveyor means.

6. The apparatus of claim 1 or 5 wherein said vibrator means comprises an electromagnet powered by a pulsating D.C. power source.

7. The apparatus of claim 6 wherein said conveyor means is supported on springs.

8. The apparatus of claim 7 wherein the pulsating frequency of said D.C. power source is substantially equal to the natural mechanical resonance frequency of said conveyor means and springs.

9. The apparatus of claim 8 wherein the vibration of said conveyor means is amplitude modulated.

10. The apparatus of claim 1 wherein said cooking container is pivotally mounted on a pivot axis, which axis is slidable along a notional line.

11. The apparatus of claim 10 wherein said pivot axis when said cooking container is in its first position is at a point along said notional line between the points of the pivot axis when the cooking container is in its second and third positions.

12. The apparatus of claim 1 further including dispenser container means comprising:
 means for holding a stack of cups;
 means for removing a cup from said stack; and
 means for positioning said cup beneath said cooking container delivery part when said cooking container is in its third position, so as to receive cooked foodstuffs therefrom.

* * * * *